United States Patent
Yang

(10) Patent No.: US 11,316,327 B2
(45) Date of Patent: Apr. 26, 2022

(54) CABLE END FITTING AND CABLE ABUTMENT AND METHOD OF SECUREMENT

(71) Applicant: Inteva Products, LLC, Troy, MI (US)

(72) Inventor: Lianming Yang, Jiangsu Province (CN)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 16/926,036

(22) Filed: Jul. 10, 2020

(65) Prior Publication Data

US 2021/0021111 A1    Jan. 21, 2021

(30) Foreign Application Priority Data

Jul. 17, 2019    (CN) .......................... 201910645143.0

(51) Int. Cl.
H02G 3/04    (2006.01)
(52) U.S. Cl.
CPC ................. H02G 3/0418 (2013.01)
(58) Field of Classification Search
CPC ...... E05B 77/34; F16B 21/082; H02G 3/0418
USPC ........................................................ 439/352
See application file for complete search history.

(56) References Cited

U.S. PATENT DOCUMENTS

| | | | |
|---|---|---|---|
| 7,758,369 B2* | 7/2010 | Miller | H01R 13/6275 439/352 |
| 9,153,889 B2* | 10/2015 | Germ | H01R 24/20 |
| 9,850,689 B2 | 12/2017 | Salamey et al. | |
| 10,006,228 B2 | 6/2018 | Kim | |
| 2009/0200123 A1* | 8/2009 | Wang | B60T 11/06 188/162 |
| 2017/0089105 A1 | 3/2017 | Margheritti | |
| 2017/0122355 A1* | 5/2017 | Estrada | F16C 1/262 |
| 2018/0026399 A1* | 1/2018 | Leigh | H01R 13/6335 439/352 |
| 2019/0017298 A1 | 1/2019 | Sardelli et al. | |
| 2019/0190198 A1* | 6/2019 | Zhang | H01R 11/22 |
| 2019/0203507 A1 | 7/2019 | Ney et al. | |
| 2021/0175660 A1* | 6/2021 | Bishop | E05B 79/00 |

FOREIGN PATENT DOCUMENTS

| | | |
|---|---|---|
| CN | 102758560 A | 10/2012 |
| CN | 105370113 A | 3/2016 |
| CN | 106948683 A | 7/2017 |
| CN | 110005283 A | 7/2019 |

OTHER PUBLICATIONS

Chinese Office Action for Application No. 201910645143.0; dated Apr. 29, 2021.

* cited by examiner

*Primary Examiner* — William H. Mayo, III
*Assistant Examiner* — Krystal Robinson
(74) *Attorney, Agent, or Firm* — Cantor Colburn LLP

(57) ABSTRACT

A cable conduit end for securing a cable to a cable abutment of a latch, the cable conduit end including: a housing; a pair of arm members integrally formed with the housing of the conduit end, wherein the pair of arm members are spring biased into a first position; and a platform integrally formed with the pair of arm members, the platform extending laterally from the pair of arm members.

9 Claims, 3 Drawing Sheets

CABLE END FITTING AND CABLE ABUTMENT AND METHOD OF SECUREMENT

CROSS-REFERENCE TO RELATED APPLICATION

The present application claims priority to Chinese patent present application No. 201910645143.0, filed on Jul. 17, 2019, and entitled "CABLE END FITTING AND CABLE ABUTMENT AND METHOD OF SECUREMENT", the content of which is incorporated in the present application by reference in its entirety.

BACKGROUND

Exemplary embodiments of the present disclosure relate generally to latch mechanisms and, more particularly, to end fittings for cables in latch mechanisms.

Conventional latch mechanisms may include multiple cables, each coupled to a lever for carrying out various functions, such as locking and releasing the latch for example. Often, these cables have to be connected to the interior of the latch, accessible by only a small opening through which the cable is inserted. In addition, other components of the latch, such as the door trim fixing plug, may interfere with the positioning of the cable as it is inserted into the latch. This can make the assembly process difficult, time consuming, costly and prone to error. It is also difficult to disassemble the cable connection for maintenance without damaging the cable, the cable fitting or the latch.

When using a cable assembly to release a door latch, either from inside or outside handle, it is desirable that the sleeve, or conduit, that the cable is guided by be anchored robustly at each end so as to avoid inadvertent disengagement that would render the cable inoperable. It is also desirable that this anchor mechanism, between the cable conduit end and the housing or bracket that it is retained by, be capable of being installed through a minimal amount of force, for ergonomic reasoning, and be able to withstand a high disengagement force per the aforementioned reasoning.

Accordingly, it is desirable to provide a cable abutment and complimentary cable end that provides a quick and efficient means for securing and/or removing a cable conduit to a portion of a latch being operated by the cable.

SUMMARY OF THE DISCLOSURE

Disclosed is a cable conduit end for securing a cable to a cable abutment of a latch, the cable conduit end including: a housing; a pair of arm members integrally formed with the housing of the conduit end, wherein the pair of arm members are spring biased into a first position; and a platform integrally formed with the pair of arm members, the platform extending laterally from the pair of arm members.

In addition to one or more of the features described above, or as an alternative to any of the foregoing embodiments, the cable conduit end also includes a cable extending through an opening in the cable conduit end.

In addition to one or more of the features described above, or as an alternative to any of the foregoing embodiments, the cable conduit end also includes a cable sheath extending over a portion of the cable and secured to an end of the housing.

In addition to one or more of the features described above, or as an alternative to any of the foregoing embodiments, the cable conduit end also includes a flange portion that extends from a surface of the housing, wherein the flange portion and the pair of arm members are in a facing spaced relationship.

In addition to one or more of the features described above, or as an alternative to any of the foregoing embodiments, the cable conduit end also includes a pair of retention features or pawls that extend from the pair of arm members.

In addition to one or more of the features described above, or as an alternative to any of the foregoing embodiments, the housing, the flange portion, the pair of arm members, the platform, and the pair of retention features or pawls are integrally formed as a single component.

In addition to one or more of the features described above, or as an alternative to any of the foregoing embodiments, the cable conduit end is formed from plastic.

Also disclosed is a combination of a cable conduit end and a cable abutment of a latch housing, the cable conduit end being configured to secure a cable to the cable abutment, the cable conduit end including: a housing; a pair of arm members integrally formed with the housing of the conduit end, wherein the pair of arm members are spring biased into a first position; and a platform integrally formed with the pair of arm members, the platform extending laterally from the pair of arm members; and wherein the cable abutment has an opening configured to slidably received the cable conduit end therein.

In addition to one or more of the features described above, or as an alternative to any of the foregoing embodiments, the cable conduit end is configured to snap-fittingly engage the opening of the cable abutment.

In addition to one or more of the features described above, or as an alternative to any of the foregoing embodiments, the combination also includes a cable extending through an opening in the cable conduit end.

In addition to one or more of the features described above, or as an alternative to any of the foregoing embodiments, the cable conduit further comprises a flange portion that extends from a surface of the housing, wherein the flange portion and the pair of arm members are in a facing spaced relationship.

In addition to one or more of the features described above, or as an alternative to any of the foregoing embodiments, the combination also includes a pair of retention features or pawls that extend from the pair of arm members.

In addition to one or more of the features described above, or as an alternative to any of the foregoing embodiments, the housing, the flange portion, the pair of arm members, the platform, and the pair of retention features or pawls are integrally formed as a single component.

In addition to one or more of the features described above, or as an alternative to any of the foregoing embodiments, each one of the pair of flexible retention features or pawls further comprise an angled surface and an engagement surface extending therefrom, the engagement surface contacting a peripheral edge of an opening of the cable abutment.

In addition to one or more of the features described above, or as an alternative to any of the foregoing embodiments, the cable conduit end also includes a cable extending through an opening in the cable conduit end.

In addition to one or more of the features described above, or as an alternative to any of the foregoing embodiments, the cable conduit end also includes a cable sheath extending over a portion of the cable and secured to an end of the housing.

In addition to one or more of the features described above, or as an alternative to any of the foregoing embodiments, the cable conduit end is formed from plastic.

Also disclosed is a method of securing a cable conduit end to a cable abutment of a latch housing, the method including the steps of: inserting a housing of the cable conduit end into an opening of the cable abutment; deflecting a pair of arm members integrally formed with the conduit end outwardly from a first position by applying a force to a platform that extends laterally from the pair of arm members; and engaging a pair of retention features of the cable abutment with an engagement surface of a pair of retention features or pawls that extend from the pair of arm members.

In addition to one or more of the features described above, or as an alternative to any of the foregoing embodiments, the cable conduit end is configured to snap-fittingly engage the opening of the cable abutment.

In addition to one or more of the features described above, or as an alternative to any of the foregoing embodiments, the combination also includes a cable extending through an opening in the cable conduit end.

In addition to one or more of the features described above, or as an alternative to any of the foregoing embodiments, the cable conduit further comprises a flange portion that extends from a surface of the housing, wherein the flange portion and the pair of arm members are in a facing spaced relationship.

In addition to one or more of the features described above, or as an alternative to any of the foregoing embodiments, the combination also includes a pair of retention features or pawls that extend from the pair of arm members.

In addition to one or more of the features described above, or as an alternative to any of the foregoing embodiments, the housing, the flange portion, the pair of arm members, the platform, and the pair of retention features or pawls are integrally formed as a single component.

In addition to one or more of the features described above, or as an alternative to any of the foregoing embodiments, each one of the pair of flexible retention features or pawls further comprise an angled surface and an engagement surface extending therefrom, the engagement surface contacting a peripheral edge of an opening of the cable abutment.

In addition to one or more of the features described above, or as an alternative to any of the foregoing embodiments, the cable conduit end also includes a cable extending through an opening in the cable conduit end.

In addition to one or more of the features described above, or as an alternative to any of the foregoing embodiments, the cable conduit end also includes a cable sheath extending over a portion of the cable and secured to an end of the housing.

In addition to one or more of the features described above, or as an alternative to any of the foregoing embodiments, the cable conduit end is formed from plastic.

The above-described and other features and advantages of the present disclosure will be appreciated and understood by those skilled in the art from the following detailed description, drawings, and appended claims.

BRIEF DESCRIPTION OF THE DRAWINGS

Embodiments of the present disclosure will now be described, by way of example only, with reference to the accompanying drawings in which.

DETAILED DESCRIPTION

Various embodiments of the present disclosure are directed to a cable end fitting configured for a snap-in design wherein once secured, the cable end fitting withstands axial and/or radial forces removal forces. The cable end fitting is configured to have a low insertion force as compared to the higher removal forces it is capable of withstanding. In addition, the cable end fitting of the present disclosure allows for ease of removal for maintenance purposes.

Figure 1:
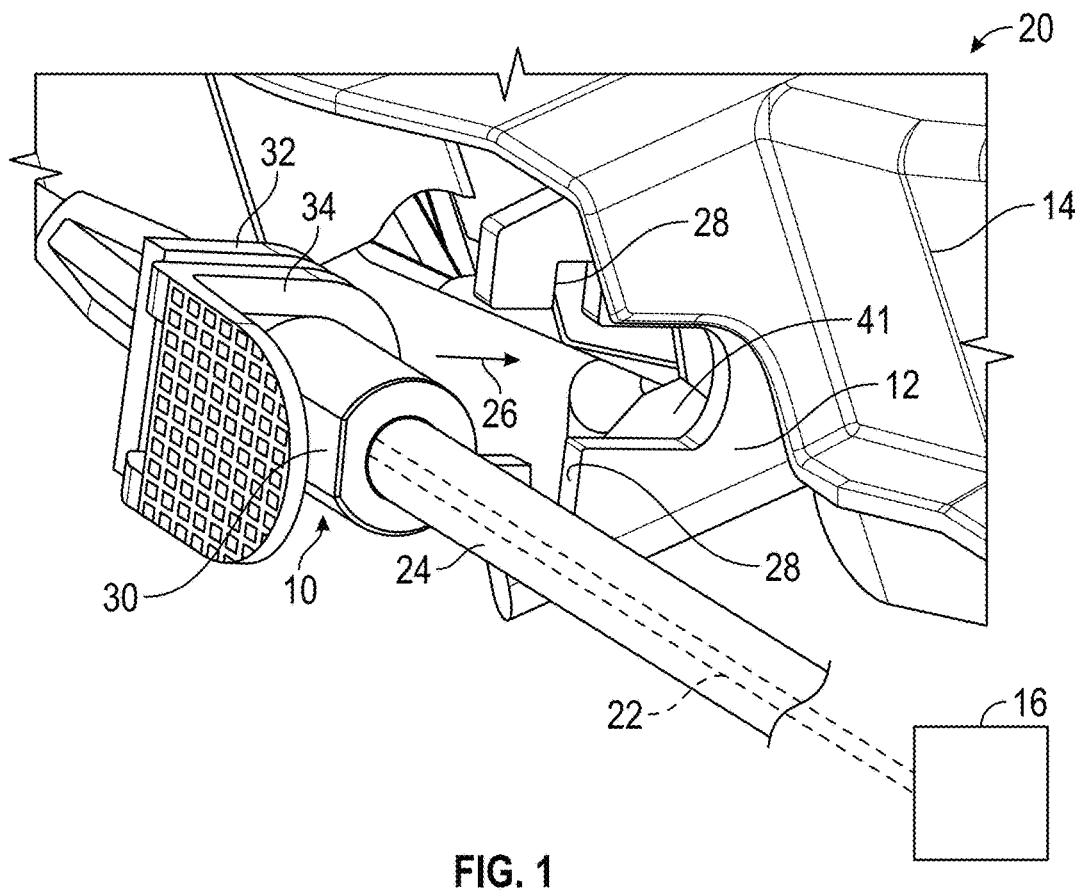
FIGS. 1-2 are perspective views of a portion of a latch housing including a cable abutment and a cable end configured for securement of a cable and/or cable sheath to the latch housing.
Figure 2:
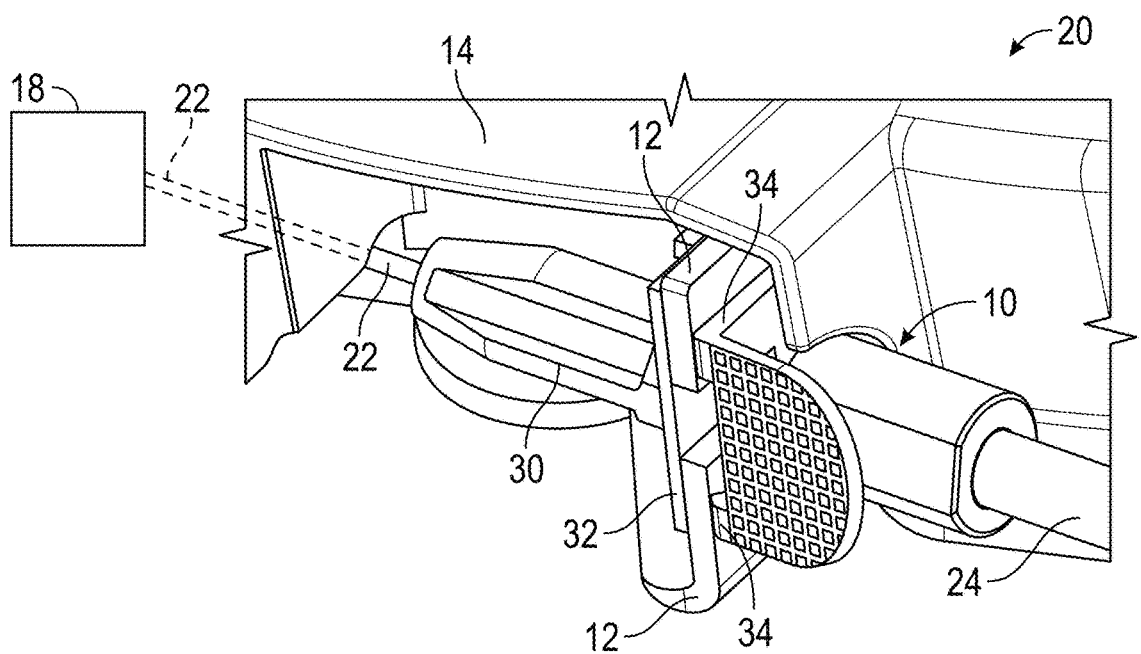

Referring now to the attached FIGS. a cable conduit end, conduit end, cable end fitting or cable attachment end 10 is illustrated. The cable conduit end 10 is configured to be snap-fittingly inserted into a cable abutment or retention plate 12, which in one embodiment may be a portion of a latch housing 14 or alternatively the cable abutment 12 is separately secured to the latch housing 14. In one embodiment, the latch housing 14 may be a portion of a vehicle latch that is operated by an inside release handle or outside release handle 16 that is operatively coupled to a portion 18 (illustrated schematically) of the latch 20 via a cable 22 that is slidably received within a cable sheath 24 and the cable conduit end 10. The cable 22 and cable sheath 24 are formed from flexible materials and the cable 22 is capable of transmitting a pulling or pushing force. In one non-limiting embodiment and as is known in the related arts, the cable 22 and cable sheath 24 may be collectively referred to as a Bowden cable. In FIG. 1, the cable conduit end 10 is shown as not being attached to housing 14 yet. In one embodiment, the cable conduit end may be formed out of an easily molded material such as plastic.

In order to secure the cable conduit end 10 to the housing 14, the cable conduit end 10 is inserted into the cable abutment 12 of the housing 14 in the direction of arrow 26. The cable conduit end 10 is configured to be secured thereto via a low insertion effort while having a high retention valve. In order to do this, the cable conduit end 10 and the latch cable abutment 12 are configured to accept a linear load geometry.

With the proposed geometry, the retention value of the conduit end 10 can be drastically increased without sacrificing the desirability of a low insertion effort. In order to do so, retaining features or openings or slots 28 are added to the cable abutment 12 in order to keep a barrel or housing 30 of the conduit end 10 securely fastened to the latch housing 14.

The cable conduit end has a flange or flange portion 32 that extends outwardly from housing 30. Opposite and spaced from the flange portion 32 is a pair arm members 34 each connected to the housing 30 at one end and a platform 36 at the other end. As such and in one embodiment, the flange portion 32 and the pair of arm members 34 are located on opposite sides of the cable abutment 12 when the cable conduit end 10 is secured thereto. With the conduit end 10 in the proper orientation with respect to the cable abutment 12, two pairs of flexible retention features or pawls 38 integrated into the pair of arm members 34, will align with and engage the retaining features 28 of the latch housing cable abutment 12.

Figure 3:
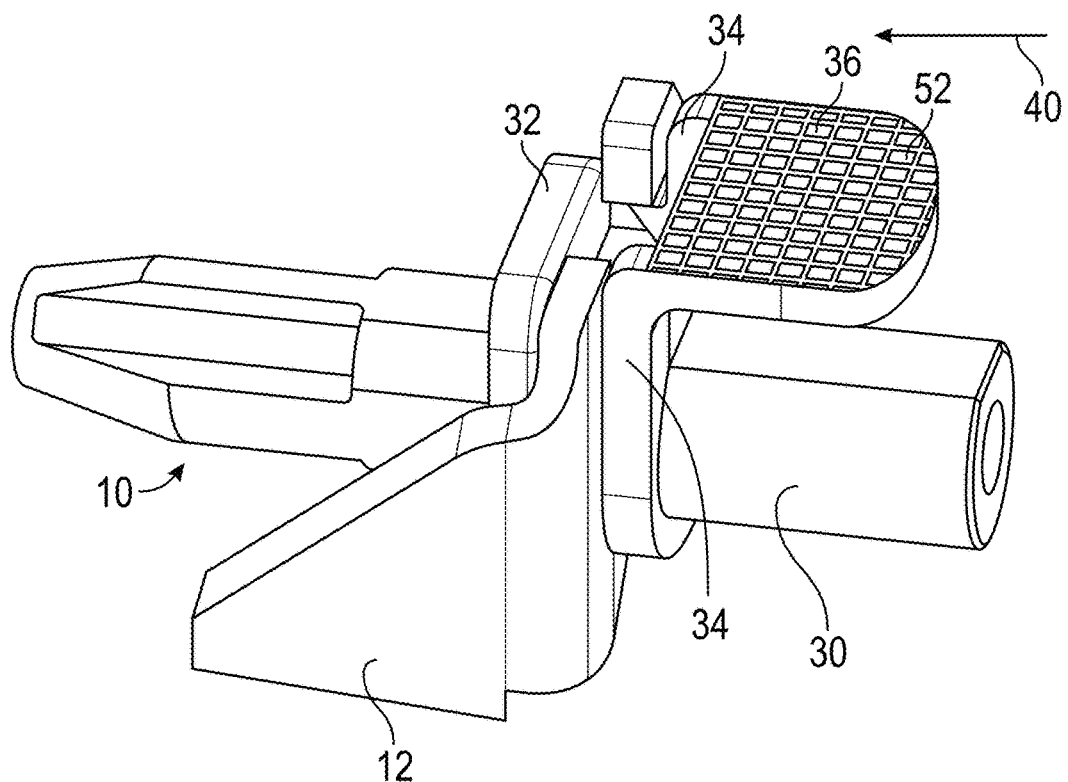
FIGS. 3 and 4 are perspective views of a cable end fitting according to an embodiment of the present disclosure.
Figure 4:
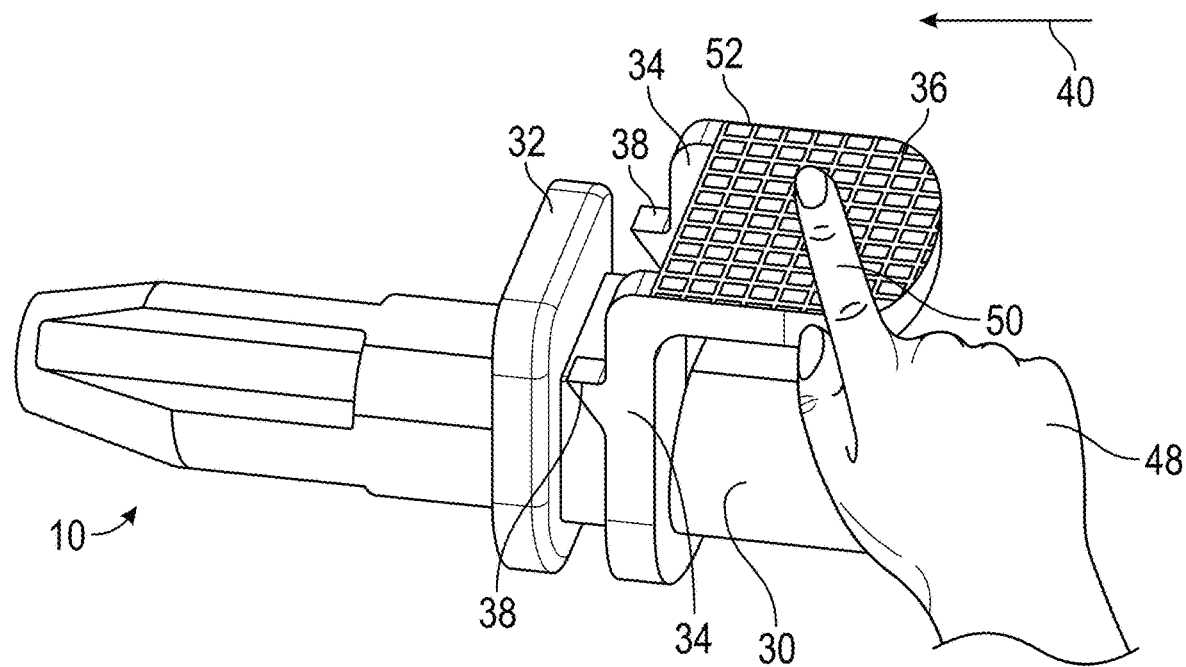
Figure 5:
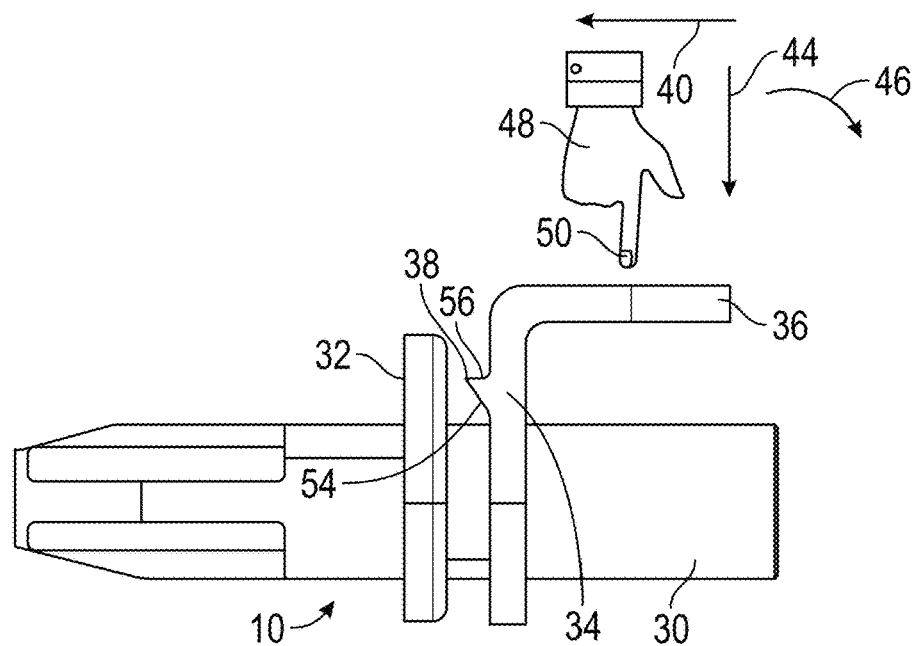
FIG. 5 is a side view of a cable abutment according to an embodiment of the present disclosure.
Figure 6:
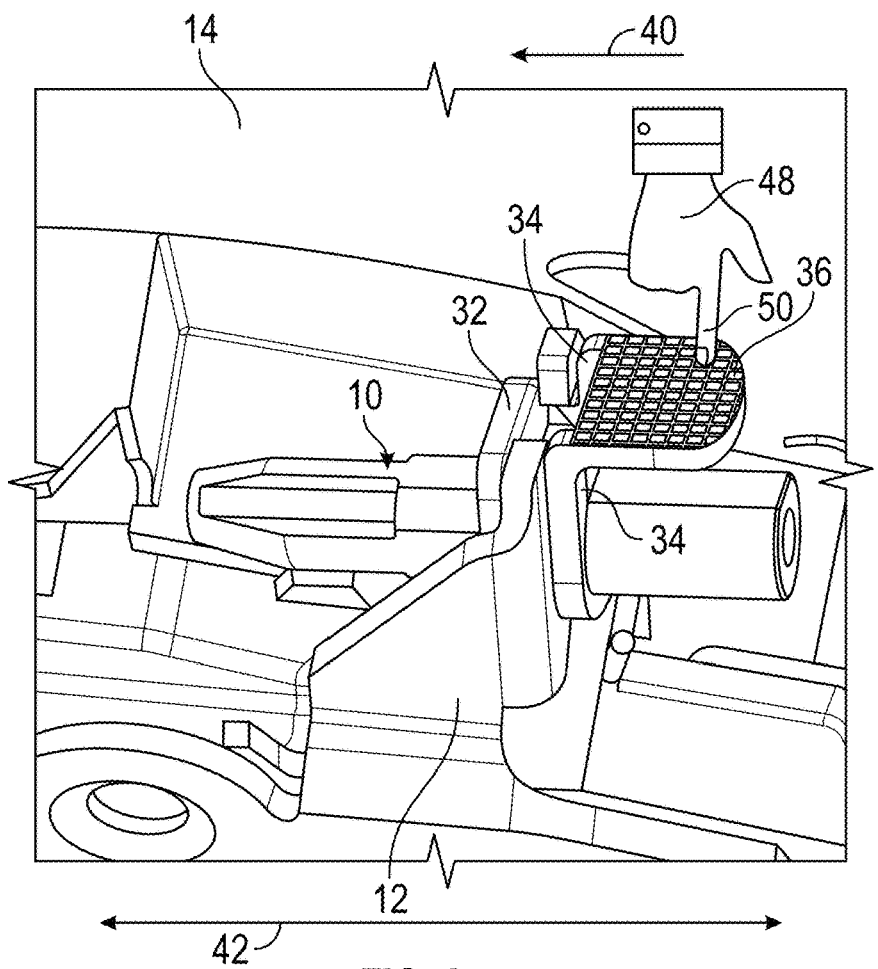
FIG. 6 is a perspective view illustrating the cable end secured to the cable abutment.

In one embodiment, the pair of arm members 34 are formed from a resilient material such as plastic or equivalents thereof and are spring biased in the direction of arrows 40 into the positions illustrated in the FIGS. For example, the pair of arm members 34 and flange portion 32 may be integrally formed with conduit end 10. As the conduit end 10 is inserted into an opening 41 of the latch housing cable abutment or retention plate 12, the flexible arm members will deflect outwardly against the biasing force of arrows 40. Accordingly and during assembly of conduit end 10 to opening 41 of the cable abutment or retention plate 12, the deflection of these features outwardly allow for a low insertion effort. Once the conduit end 10 is fully inserted into opening 41 these features will spring back in the direction of arrows 40 to the position or first position illustrated in the FIGS. At this point and as illustrated in at least FIGS. 3 and 6, a surface of the retaining features or pawls 38 engage a respective one of retaining features or openings 28.

Once engaged, a pull-out force on the conduit end in a direction opposite to arrow 26 will be managed by the geometry of the retaining features or pawls 38. Furthermore, the geometry of the retaining features or pawls 38 and the latch housing cable abutment interface is such that if abusive loading occurs, the engagement at this interface will be locked in, further assuring engagement. Still further, the pair of arm members 34 and the flange or flange portion 32 will also engage opposite ends of the cable abutment of the retention plate 12 in order to prevent sliding or movement of the conduit end 10 in the direction of arrows 42.

As illustrated in the FIGS., the platform 36 extends laterally away from the pair of arm members 34 in order to provide an easily accessible surface upon which a release force in the direction of arrow 44 may be applied. Once a force is applied in the direction of arrow 44 when the cable conduit end 10 is secured to the cable abutment or retention plate 12, the platform 36, the pair of arm members 34, and the retaining features or pawls 38 will pivot or rotate in the direction of arrow 46 such that the retaining features or pawls 38 will move away from their engagement with openings 28. This will allow the cable conduit end 10 to be easily removed from the cable abutment or retention plate 12. It is also understood that the force in the direction of arrow 44 may also be applied when the cable conduit end 10 is being inserted and secured to the cable abutment or retention plate 12.

In one non-limiting embodiment, the platform 36 is orthogonally positioned with respect to the pair of arm members 34. Of course, other angular configurations are considered to be within the scope of the present disclosure.

In one embodiment and as illustrated in the attached FIGS., the user applied force in the direction of arrow 44 may be applied by a user's hand 48 or finger 50. In one non-limiting embodiment, a surface of the platform 36 may be configured to have a knurled surface 52 in order to provide an easily gripped surface. The force in the direction of arrow 44 may also be applied by a tool inserted into an opening of a housing of the latch into which the conduit end 10 is secured to be secured and/or removed from.

In one embodiment, the housing 30, the flange portion 32, the pair of arm members 34, the platform 36, and the pair of flexible retention features or pawls 38 are integrally formed as a single component (e.g. cable conduit end 10). In one embodiment, this single component is formed from a resilient material such as plastic or equivalents thereof.

In yet another embodiment, each one of the pair of flexible retention features or pawls 38 further comprise an angled surface 54 and an engagement surface 56 extending therefrom. The engagement surface 56 contacts the a peripheral portion of the abutment 12 that forms opening 28 when the cable conduit end 10 is secured to the abutment 12.

Conduit end 10 also has a passage extending therethrough to allow cable 22 to pass through. Sheath 24 is also secured to the conduit end 10 by any suitable process such as crimping, insert molding, etc.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A cable conduit end for securing a cable to a cable abutment of a latch, the cable conduit end comprising:
    a housing;
    a pair of arm members formed with the housing of the conduit end, the pair of arm members extending from a surface of the housing, the pair of arm members being spring biased into a first position;
    a flange portion formed with the housing, the flange portion extending from a surface of the housing, the flange portion and the pair of arm members are in a facing spaced relationship when the pair of arm member are in the first position;
    a pair of retention features or pawls that extend from the pair of arm members towards the flange portion; and
    a platform formed with the pair of arm members, the platform extending laterally from the pair of arm members, wherein the housing, the flange portion, the pair of arm members, the platform, and the pair of retention features or pawls are integrally formed as a single component.

2. The cable conduit end as in claim 1, further comprising a cable extending through an opening in the cable conduit end.

3. The cable conduit end as in claim 2, further comprising a cable sheath extending over a portion of the cable and secured to an end of the housing.

4. The cable conduit end as in claim 1, wherein the cable conduit end is formed from plastic.

5. In combination, a cable conduit end and a cable abutment of a latch housing, the cable conduit end being configured to secure a cable to the cable abutment, the cable conduit end comprising:
    a housing;
    a pair of arm members formed with the housing of the conduit end, the pair of arm members extending from a surface of the housing, the pair of arm members being spring biased into a first position;
    a flange portion formed with the housing, the flange portion extending from a surface of the housing, the flange portion and the pair of arm members are in a facing spaced relationship when the pair of arm member are in the first position;
    a pair of retention features or pawls that extend from the pair of arm members towards the flange portion; and
    a platform formed with the pair of arm members, the platform extending laterally from the pair of arm members, and the housing, the flange portion, the pair of arm members, the platform, and the pair of retention features or pawls are integrally formed as a single component; and wherein the cable abutment has an opening configured to slidably received the cable conduit end therein and wherein portions of the cable abutment are located between the flange portion and the pair of arm members when the cable conduit end is secured to the cable abutment.

6. The combination as in claim 5, wherein each one of the pair of flexible retention features or pawls further comprise an angled surface and an engagement surface extending therefrom, the engagement surface contacting a peripheral edge of an opening of the cable abutment.

7. The combination as in claim 5, wherein the cable conduit end is configured to snap-fittingly engage the opening of the cable abutment.

8. The combination as in claim 6, further comprising a cable extending through an opening in the cable conduit end.

9. A method of securing a cable conduit end to a cable abutment of a latch housing, comprising:

inserting a housing of the cable conduit end into an opening of the cable abutment;

deflecting a pair of arm members formed with the conduit end outwardly from a first position by applying a force to a platform that extends laterally from the pair of arm members, the pair of arm members extending from a surface of the housing, the pair of arm members being spring biased into the first position, a flange portion formed with the housing, the flange portion extending from the surface of the housing, the flange portion and the pair of arm members are in a facing spaced relationship when the pair of arm members are in the first position, a pair of retention features or pawls that extend from the pair of arm members towards the flange portion; and engaging a pair of retention features of the cable abutment with an engagement surface of the pair of retention features or pawls that extend from the pair of arm members, wherein the pair of retention features of the cable abutment are located between the pair of arm members and the flange portion when the cable conduit end is secured to the cable abutment of the latch housing.

* * * * *